United States Patent [19]

Krause

[11] Patent Number: 4,915,761
[45] Date of Patent: Apr. 10, 1990

[54] MAGNETIC BEAD SPOTTER

[75] Inventor: David P. Krause, Hartville, Ohio

[73] Assignee: Bridgestone/Firestone, Inc., Akron, Ohio

[21] Appl. No.: 464,720

[22] Filed: Feb. 18, 1983

[51] Int. Cl.$^4$ .......................... B29D 30/00; G01B 7/00
[52] U.S. Cl. ..................................... 156/111; 156/396; 324/207.13; 360/1; 361/143
[58] Field of Search ............... 156/126, 111, 123, 124, 156/127, 128.1, 128.6, 129, 130, 130.3, 130.7, 131, 132, 133, 135, 64, 396, 398, 404, 406.2, 406.4, 414; 360/1; 361/143, 145, 267; 324/206, 207, 208; 152/330 R

[56] References Cited

U.S. PATENT DOCUMENTS

| | | | |
|---|---|---|---|
| 2,355,940 | 8/1944 | Zuschlag | 361/267 |
| 2,920,674 | 1/1960 | Bull | 152/362 R X |
| 3,160,865 | 12/1964 | Tourtellotte | 360/1 |
| 3,179,929 | 4/1965 | Tourtellotte | 152/362 R X |
| 3,460,119 | 8/1969 | Ugo et al. | 152/330 R X |
| 3,460,199 | 8/1969 | Heckrotte et al. | 425/131.5 |
| 3,503,023 | 3/1970 | Biaggini | 246/2 E X |
| 3,750,120 | 7/1973 | McCarty | 152/330 R X |
| 4,007,080 | 2/1977 | Klöpper | 156/126 X |
| 4,010,354 | 3/1977 | Apicella, Jr. et al. | 152/330 R X |
| 4,269,649 | 5/1981 | Vanderzee | 156/126 X |
| 4,443,290 | 4/1984 | Loeffler et al. | 156/396 |

*Primary Examiner*—Michael W. Ball
*Assistant Examiner*—Geoffrey L. Knable
*Attorney, Agent, or Firm*—Ronald Brietkrenz

[57] ABSTRACT

A system for demagnetizing and subsequently selectively magnetizing a small portion of a ferrous member embedded in a green tire carcass in order to facilitate the rotational orientation of the tire carcass when it is transferred to a subsequent processing machine for the application of additional components. A magnetic probe associated with the second processing machine senses the portion of the magnetized area of the bead member and is able to rotationally orient the green tire carcass such that the component applied to the green tire carcass at the second processing machine may be rotationally oriented with respect to the components applied at the first processing machine.

6 Claims, 2 Drawing Sheets

MAGNETIC BEAD SPOTTER

BACKGROUND OF THE INVENTION

I. Field of the Invention

This invention relates to a manufacturing system and more particularly to a means for facilitating the transfer of a green tire carcass or similar article from one operative machine to another while maintaining the rotational orientation of the green tire carcass. Specifically, the instant invention relates to a means for magnetizing a small portion of a ferrous member embedded in the green tire carcass. The bead of the green tire carcass which is comprised of a ferrous material is demagnetized over its entire length and then magnetized in a small portion thereof at a position corresponding to a known position on the green tire carcass. The green tire carcass is then transferred to a second operative machine for further processing. A magnetic probe senses the position of the small magnetized area of the bead member and is thus able to rotationally orient the green tire carcass.

II. Description of the Prior Art

The use of magnetization in order to mark an item is well known in the art as disclosed by U.S. Pat No. 3,503,023 to Biaggini which discloses a device for marking a railroad wheel as its rolls along a rail of track, the device includes an electromagnet held by a magnetically permeable support affixed to the rail, the electromagnet, support and rail defining a magnetic circuit. The use of magnetic marking in connection with tire fabrication is also well known as evidenced by U.S. Pat. No. 3,750,120 to McCarty which discloses a method and apparatus for imprinting coded magnetic indicia on a specially prepared pneumatic tire and for reading out such indicia once recorded. U.S. Pat. No. 4,010,354 to Apicella, Jr., et al., relates to a method and apparatus for encoding tire identifying data on a specially prepared tire builder's tag, applying the tag to the sidewall of a green tire, and reading out such encoded data at various stages in the tire manufacturing process to facilitate product quality assurance and inventory control.

Even further, the use of magnetic making to encode information on a structural member of a tire is also well known in the art as disclosed by U.S. Pat. No. 2,920,674 to Bull which discloses a method of permanently recording information relating to the tire directly thereon by magnetizing at least one of the structural or reinforcing components in an indicia forming pattern to provide said information thereon in code form. U.S. Pat. No. 3,160,865 to Tourtellotte relates to an automatic signal translating apparatus for translating the information placed on magnetized bead wires of tires. U.S. Pat. No. 3,179,929 also to Tourtellotte concerns a means responsive to the position of the code pulses on a tire with respect to a reference point for separating the code pulses. U.S. Pat. No. 3,460,119 to Ugo, et al., discloses an apparatus for recording a digital magnetic code having an indexing digit and information digits on magnetizable means extending circumferentialy of a tire carcass or the like in opposite region thereof and comprises a first plurality of magnetizing members adapted to be positioned circumferentially of one of the magnetizable means.

European Patent Application No. 81108248.6 concerns a means for encoding information on a structural member of a tire by alternately reversing the direction of plurality of magnetized areas so that each magnetic pull of each magnetized area has the same plurality of the adjacent magnetic pull of adjacent magnetized areas.

U.S. Pat. No. 2,355,940 to Zuschlag relates to the demagnetization of magnetic bodies and contemplates the subjection of the article to be magnetized simultaneously to an alternating current field and to a direct current field both suitably controlled.

Although the prior art discloses many schemes for magnetically encoding information on structural members of a tire, none of the art noted above provides a means for rotationally positioning a green tire carcass in order to facilitate the transfer of the green tire carcass from a first stage automated tire assembly machine to a second stage automated tire assembly machine, wherein the green tire carcass may be precisely rotationally oriented at the second stage system in order that the processing of the green tire carcass at the second stage may take place with respect to a magnetic marking placed on the green tire carcass before it was removed from the first stage assembly machine, wherein the location of the magnetic mark corresponds to a physical feature of a green tire carcass.

There is, therefore, a need for a means for magnetically marking a green tire carcass in order to facilitate transfer of the green tire carcass from a first stage automated tire assembly machine to a second stage automated tire assembly machine, wherein the components applied during the second stage tire procedure may be precisely placed with respect to the components of the green tire carcass fabricated during the first stage tire construction procedure.

The instant invention solves this need by providing a means for demagnetizing the bead of a green tire carcass near the end of the first stage tire assembly process and encoding, by means of magnetizing a small portion of the bead of the green tire carcass, at a position corresponding to the physical structure of the green tire carcass. The green tire carcass is then transferred to the second stage tire assembly machine, wherein the position of the magnetized portion of bead is sensed in order to position the green tire carcass for proper placement of subsequent components upon the green tire carcass.

SUMMARY OF THE INVENTION

The present invention relates to a means for the fabrication of tires and more particularly to a means that facilitates the transfer of a green tire carcass from a first stage tire assembly machine to a second stage tire assembly machine, wherein the components of the green tire carcass produced by the first stage tire assembly machine may be rotationally oriented with respect to the subsequent application of components in the second stage of the tire assembly procedure.

DESCRIPTION OF EXEMPLARY EMBODIMENTS

Figure 1:
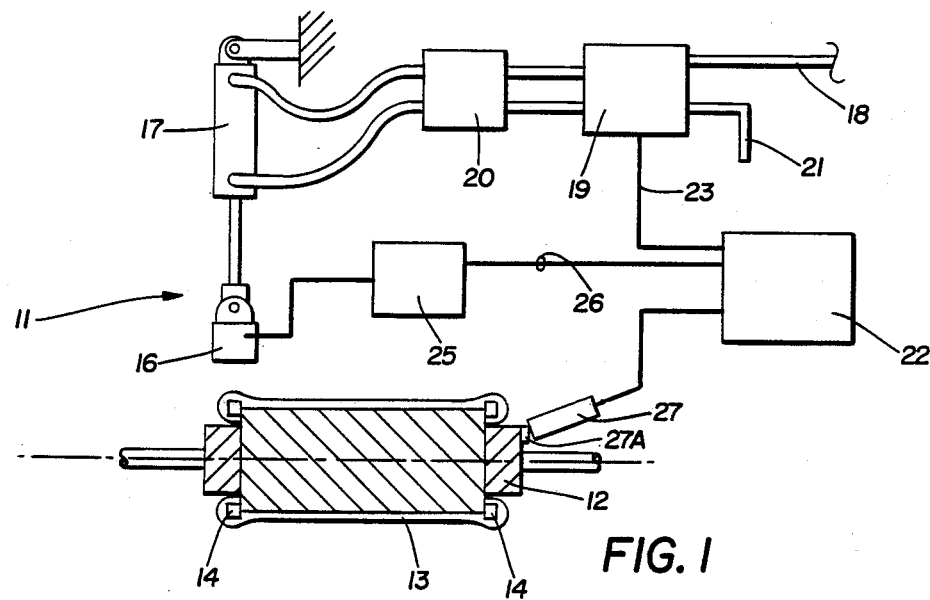
FIG. 1 is a schematic illustration of the means employed by the instant invention to demagnetize the bead of the green tire carcass and to magnetize a small portion thereof.

Referring now to FIG. 1 of the drawings, there is disclosed a simplified schematic illustration of the demagnetizing/encoding apparatus 11 employed by the instant invention.

The demagnetizing/encoder apparatus 11 is adapted to be used in conjunction with an automated tire assembly machine such as that disclosed in U.S. Pat. No. 4,443,290 to Loeffler, et al., filed June 2, 1982, which employs a plurality of tire building drums which are transferred to various workstations in order to apply components to the tire building drums and thus fabricate a tire.

Shown in FIG. 1 is a tire building drum 12 having disposed thereon green tire carcass 13. The green tire carcass 13 is generally cylindrical in shape having two separate beads 14 at each end thereof. The green tire carcass 13 is shown in its completed first stage state, that is, all of the components that can be applied without shaping of the tire have been applied to the green tire carcass 13.

In order to complete the fabrication of the tire using the green tire carcass 13, it is necessary to transfer the green tire carcass 13 from a first stage tire assembly machine to a second stage tire assembly machine wherein the green tire carcass 13 is shaped and has further components applied thereto.

During the fabrication of the first stage green tire carcass 13, components were wrapped around the tire building drum 12 in order to produce the green tire carcass. During the application of these components to the tire building drum 12, the starting position of each component with respect to the tire building drum was carefully controlled in order to position the overlap of the applied components in order to eliminate a double overlap in the construction of the green tire carcass 13. It is also desirable to eliminate any double overlaps with respect to the components applied during the first stage tire construction process and those components applied during the second stage tire construction process. There is, therefore, a need for maintaining the rotational orientation of the green tire carcass 13 when it is transferred from the first stage tire assembly machine to the second stage tire assembly machine. The instant invention solves this problem.

The demagnetizing/encoding apparatus 11 is utilized to demagnetize one of the beads 14 and subsequently apply a magnetic mark to said bead in order to provide a means for rotationally orienting the green tire carcass at a subsequent stage in the tire fabrication process.

The demagnetizing/encoding apparatus 11 is comprised of a transformer 16 which, in the exemplary embodiment, is a Model 349-102 transformer manufactured by Custom Coil of Zanesville, Ohio. The transformer 16 is affixed to the rod of air cylinder 17 in order to be movable by actuation of the air cylinder 17. The transformer 16 may thus be moved from a position proximate the bead 14 of the green tire carcass 13 to a position distant from the bead 14 by actuation of the air cylinder 17. The air cylinder 17 is actuated by compressed air provided on supply line 18 through air valve 19 and flow control valve 20. The air is exhausted through exhaust line 21. The air valve 19 is actuated by means of a control signal provided by the programmable controller 22 provided on output line 23.

There is thus provided means for actuating the air cylinder 17 in response to control commands produced by the programmable controller 22 which in turn actuates the air valve 19 allowing compressed air to be supplied from supply line 18 through the air valve 19 and the flow control valve 20 to their cylinder 17. In the exemplary embodiment the programmble controller 22 is a Model 4001 Director programmable controller manufactured by the Struthers Dunn Company of Bettendorf, Iowa 52722. It will be appreciated by one skilled in the art that many different programmable controllers could be used in the instant invention.

Current is provided to the transformer 16 through control circuitry 25 which control circuitry is in turn governed by the output provided to the control circuitry 25 by the programmable controller 22 on output line 26.

An input signal to the programmable controller 22 regarding the rotational orientation of the tire building drum 12 is provided by photoelectric sensor 27 which is adapted to detect a photoreflective member 27A located on the tire building drum 12 from which the components were relatively placed on the tire building drum 12 by the automated tire assembly machine. The photoelectric sensor 27 detects the position of the photoreflective member 27A and provides this information to the programmable controller 22.

In operation, the demagnetizing/encoding apparatus 11 is employed during the last operation of the first stage tire assembly machine in order to mark the bead of the green tire carcass 13 with a magnetic spot indicative of the rotational orientation of the green tire carcass 13. During the last operation, which is the stitching operation, the tire drum is typically rotating at approximately 2 revolutions per second for a 20-second interval. During this operation, the control circuitry 25 applies a 110 volt AC current to the transformer 16. The air cylinder 17 is then actuated in order to cause the transformer 16 to advance to approximately 1 inch (2.54 cm) from the tire bead 14.

After an adjustable delay of approximately 3 to 10 seconds, the transformer 16 is retracted by actuation of the air cylinder 17. The 110 volt AC signal provided by the control circuitry 25 to the transformer 16 is then turned off after the electromagnet has been fully retracted. The combination of an alternating magnetic field, the rotation of the tire bead 14, and the retraction of the transformer 16 with the 110 volt AC signal still applied thereto results in the demagnetizing of the ferromagnetic material in the tire bead. The tire bead is now ready to have a small portion thereof magnetized.

After the body ply stitching operation has been completed, the tire building drum 12 is stopped at the desired location for magnetically marking the bead 14, that is, the portion of the bead 14 that is to be magnetically marked is disposed proximate to the actuated position of transformer 16. The control circuitry 25 is then caused to apply a 24 volt DC signal to the transformer 16. The air cylinder 17 is again actuated in order to cause the transformer 16 to be advanced to about 1 inch (2.54 cm) from the bead 14. The transformer 16 is then retracted and the 24 volt DC signal is removed from the transformer 16. This results in a small portion of the bead 14 being magnetized. This small magnetized portion of the bead 14 is utilized during the second stage of the tire building operation in order to re-establish the reference point on the green tire carcass 13.

Figure 2:
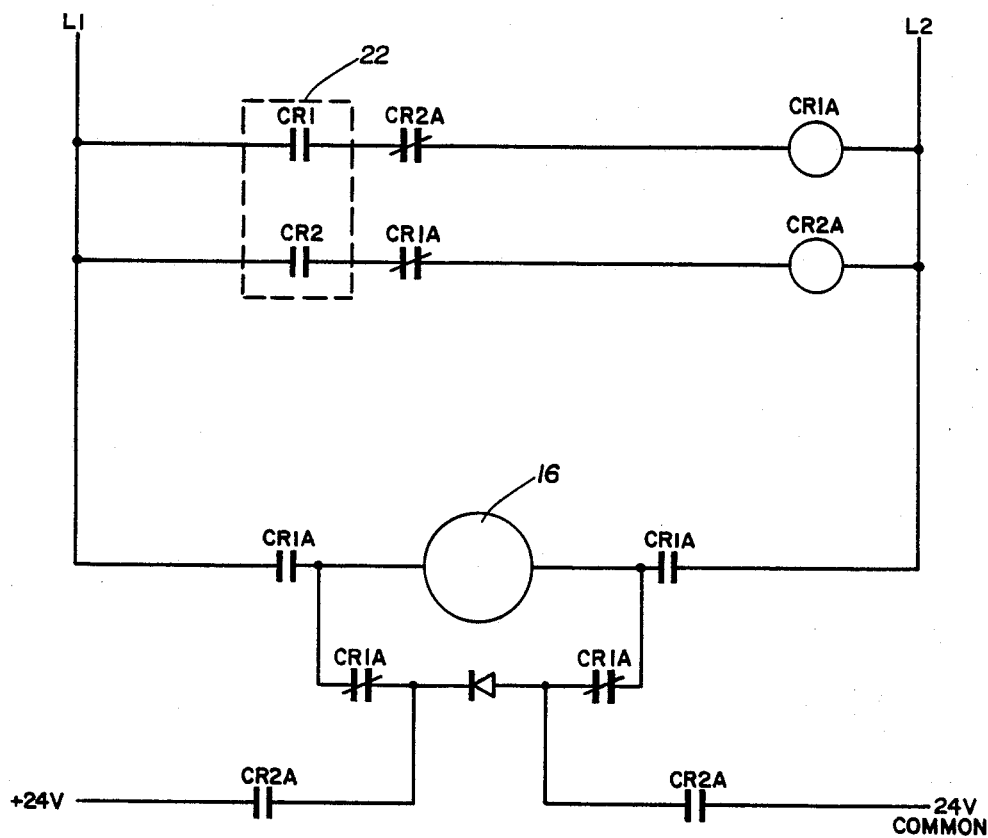
FIG. 2 is a schematic diagram of the circuitry employed to control the demagnetizing/encoding coil employed in the apparatus shown in FIG. 1.

The details of construction of the control circuitry 25 are disclosed in further detail in FIG. 2 of the drawings. The control circuitry 25 interfaces with the programmable controller 22 by means of relay contacts CR1 and CR2. The control circuitry 25 also includes relays CR1A and CR2A having contacts similarly designated as shown in FIG. 2. The output of the control circuitry 25 is provided to transformer 16 in order to selectively provide the appropriate signals to the transformer 16. A 110 volt AC signal is provided on lines L1 and L2. A 24 volt DC signal is provided on the lines marked 24 volt and 24 volt common.

It may now be appreciated that energization of the relay contact CR1 within the programmable controller 22 will cause relay CR1A to energize which will in turn activate the relay contacts similarly marked in order to cause the 110 volt AC signal provided on lines L1 and L2 to be provided to the transformer 16. Alternatively, it may be seen that upon actuation of the relay contact CR2 within the programmable controller 22 there will be actuated relay CR2A associated with the control circuitry 25 which will cause the 24 volt DC signal to be provided to the transformer 16 while removing the 110 volt AC signal therefrom. It should be noted that simultaneous energization of CRI and CR2 will not provide any signal to transformer 16. There is thus provided a means for selectively providing to the transformer 16 either a 110 volt AC signal or a 24 volt DC signal which is utilized as disclosed above.

Figure 3:
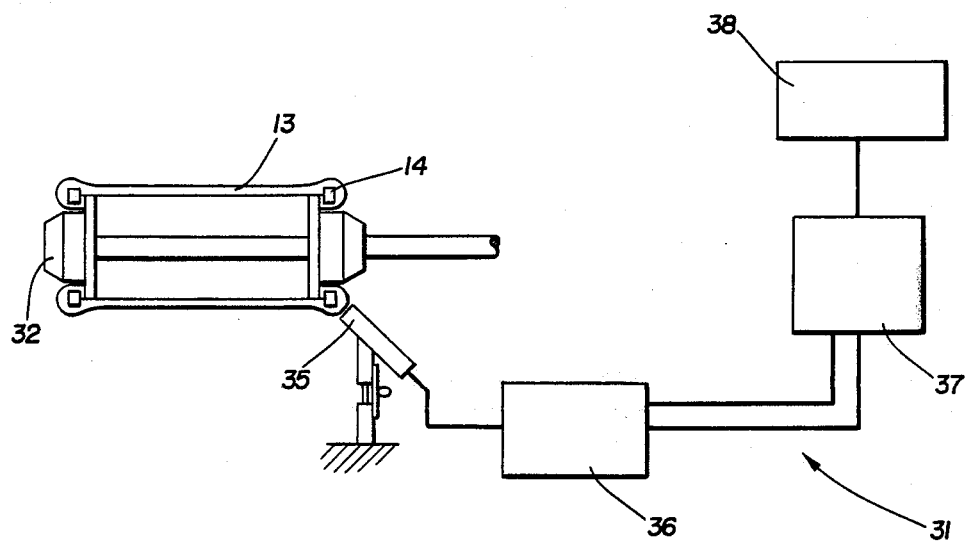
FIG. 3 is a schematic illustration of the circuitry employed by the instant invention to locate the magnetized portion of the tire bead.

Referring now to FIG. 3 of the drawings, there is disclosed the decoding apparatus 31 employed by the instant invention to locate the magnetized portion of the bead 14 of the green tire carcass. Shown in FIG. 3 is a green tire carcass 13 mounted on the drum 32 of a universal bladderless machine. The universal bladderless drum machine is a device used in the second stage of tire construction that is utilized to shape the green tire carcass into a form more closely resembling the finished tire and also to facilitate the application of the tread to the shaped green tire carcass. In order to facilitate the proper application of the tread to the green tire carcass 13 it is necessary to rotationally orient the green tire carcass 13 such that the overlapped portion of the tread will not be disposed upon any overlapped portions of components of the green tire carcass. Accordingly, the magnetic spot encoded on the bead 14 of the green tire carcass 13 in the first stage of construction is located and the tread is applied relative to the magnetic spot in order to ensure no double overlapping of tire components. The decoding apparatus 31 is utilized to detect the magnetic spot on the bead 14.

The decoding apparatus 31 is comprised of a magnetic probe 35 which is spring biased mounted in proximity to the bead 14 of the green tire carcass 13 when it is mounted on the drum 32. In the exemplary embodiment the magnetic probe 35 is a model 1-0164 Airpax magnetic probe manufactured by Airpax, Div. of N. American Philips Controls Corp., of Ft. Lauderdale, Fla. The output of the magnetic probe 35 is provided to the amplifier and level detector 36. In the exemplary embodiment the amplifier and level detector 36 is a model 3363 Indicator/Controller manufactured by Daytronic of Miamisburg, Ohio. The amplifier and level detector 36 amplifies the signal received from the magnetic probe 35 and provides an output signal when the amplified signal from the magnetic probe has reached a specified level and provides a second output when the signal provided by the magnetic probe 35 has gone from the first said level to the zero cross point of the signal. These two outputs are utilized in a manner more fully described below.

The microprocessor 37 is comprised of a Intel microprocessor, specifically, the 8748 microcomputer which consists of an 8 bit central processing unit, 1K by 8 erasable ROM memory, 64×8 RAM memory, 27 input-/output lines, an 8 bit timer/counter, and associated clock, reset, and interrupt circuits. Although an Intel microprocessor is employed in the exemplary embodiment, it should be appreciated that other commercial microprocessors could function as well. The microprocessor 37 is controlled by a programmable controller 38 which is associated with the second stage tire assembly machine.

Figure 4:
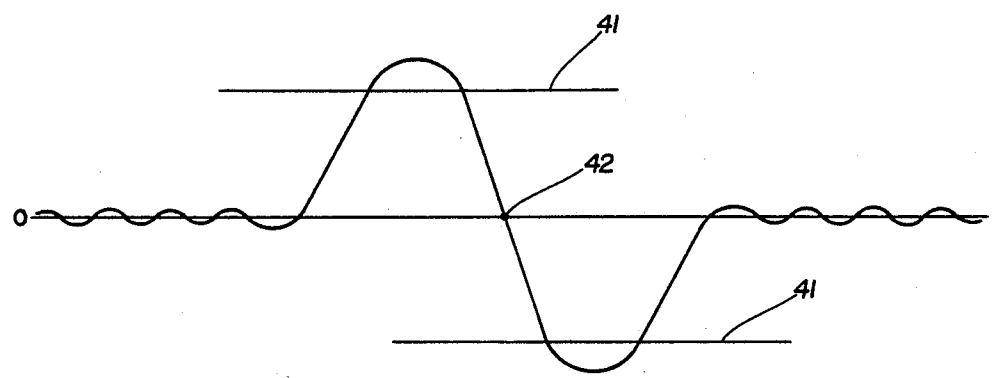
FIG. 4 is a representation of the output signal of the circuitry shown in FIG. 3 of the drawings.

In operation the magnetic probe 35 detects the magnetic spot on the bead 14 and produces an output signal typically as shown in FIG. 4 of the drawings. The small undulations of the signal about the zero reference line represent magnetic noise on the bead and in the detection circuitry. It can be readily seen that as the magnetic spot of the bead passes by the magnetic probe 35 the signal produced by the magnetic probe causes a significant divergence from the zero reference line representing the detection of the first pole of the magnetized spot on the bead 14. As the magnetic probe 35 senses the opposite pole of the magnetic spot on the bead 14, the output signal is diverted in the opposite direction past the zero reference line in response to the second pole of the magnetic spot.

In the exemplary embodiment the location of the magnetic spot on the bead 14 is determined by the zero crossing point after a magnitude enable level 41 has been reached. That is, when the output signal of the magnetic probe 35 exceeds the magnitude enable level 41 a subsequent zero crossing, such as indicated by zero cross point 42, will be used by the microprocessor 37 to provide an output pulse to the programmable controller 38 indicating that the magnetic spot has been detected. The programmable controller 38 then utilizes this output to cause the second stage components to be applied in such a manner as to eliminate any double overlap of components.

There is thus provided a means wherein the components of the green tire carcass produced by the first stage tire assembly machine may be rotationally oriented with respect to the subsequent application of components in the second stage of the tire assembly procedure.

It will be apparent to those skilled in the art that various modifications and additions may be made in the instant invention without departing from the essential features thereof, which are intended to be defined and secured by the appended claims.

I claim:

1. An apparatus for determining the rotational orientation of a green tire carcass having a ferrous member therein, comprising:
    (a) first means for demagnetizing said ferrous member;
    (b) second means adapted to magnetize a small portion of said ferrous member; and
    (c) third means adapted to detect the magnetization of said ferrous member, wherein said third means comprises:
    (a) magnetic probe means;

(b) amplifying means adapted to receive the output of said magnetic probe means;

(c) level detection means adapted to receive the output of said amplifying means; and (d) logic means adapted to receive the output of said level detection means.

2. The apparatus of claim 1 wherein said logic means provides an output in response to a zero crossing signal provided by said level detection means.

3. An apparatus for determining the rotational orientation of a green tire carcass having a ferrous member therein, comprising:

(a) first means for demagnetizing said ferrous member;

(b) second means adapted to magnetize a small portion of said ferrous member; and (c) third means adapted to detect the magnetization of said ferrous member wherein said first and second means is associated with an automated first stage tire assembly machine and said third means is associated with an automated second stage tire assembly machine.

4. A method for transferring a green tire carcass having a ferrous member therein from a first system to a second system wherein the rotational orientation of said green tire carcass is maintained, comprising the steps of:

(a) demagnetizing said ferrous member;

(b) magnetizing a small portion of said ferrous member at a predetermined position;

(c) transferring said green tire carcass from said first system to said second system; and (d) detecting said portion of said ferrous member that is magnetized.

5. The method of claim 4 further comprising the step of rotating said magnetized portion of said ferrous member to a predetermined position.

6. In an apparatus for detecting a magnetized area in a ferrous member contained in a green tire carcass employing a magnetic probe, the improvement comprising means for detecting the zero crossing of the output of said magnetic probe.

* * * * *

UNITED STATES PATENT AND TRADEMARK OFFICE
CERTIFICATE OF CORRECTION

PATENT NO. : 4,915,761

DATED : April 10, 1990

INVENTOR(S) : David P. Krause

It is certified that error appears in the above-identified patent and that said Letters Patent is hereby corrected as shown below:

Title page, item (21)
   "464,720" should read -- 467,720 --

Column 1, line 43
   "making" should read -- marking --

Column 1, line 60
   "circumferentialy" should read -- circumferentially --

Column 4, line 8
   "their" should read -- the air --

Column 6, line 3
   "cross" should read -- crossing --

Column 6, line 39
   "cross" should read -- crossing --

Signed and Sealed this

Twenty-eighth Day of April, 1992

Attest:

HARRY F. MANBECK, JR.

Attesting Officer

Commissioner of Patents and Trademarks